US011582467B2

(12) United States Patent
Nguyen et al.

(10) Patent No.: US 11,582,467 B2
(45) Date of Patent: Feb. 14, 2023

(54) SAMPLED IMAGE COMPRESSION METHODS AND IMAGE PROCESSING PIPELINE

(71) Applicants: The Regents of the University of California, Oakland, CA (US); University of Dayton, A Corp. of Ohio, Dayton, OH (US)

(72) Inventors: Truong Nguyen, San Diego, CA (US); Yee Jin Lee, San Diego, CA (US); Keigo Hirakawa, Dayton, OH (US)

(73) Assignees: The Regents of the University of California, Oakland, CA (US); University of Dayton, Dayton, OH (US)

( * ) Notice: Subject to any disclaimer, the term of this patent is extended or adjusted under 35 U.S.C. 154(b) by 882 days.

(21) Appl. No.: 16/513,244

(22) Filed: Jul. 16, 2019

(65) Prior Publication Data

US 2020/0021823 A1     Jan. 16, 2020

Related U.S. Application Data

(60) Provisional application No. 62/698,467, filed on Jul. 16, 2018.

(51) Int. Cl.
*H04N 19/169* (2014.01)
*H04N 19/63* (2014.01)
(Continued)

(52) U.S. Cl.
CPC .......... *H04N 19/1883* (2014.11); *G06T 1/20* (2013.01); *H04N 9/04551* (2018.08);
(Continued)

(58) Field of Classification Search
CPC .......... H04N 19/1883; H04N 9/04551; H04N 9/3182; H04N 19/124; H04N 19/186; G06T 1/20
See application file for complete search history.

(56) References Cited

U.S. PATENT DOCUMENTS

| 5,757,973 | A | * | 5/1998 | Wilkinson | ............. | H04N 19/63 |
| | | | | | | 375/E7.056 |
| 6,166,664 | A | * | 12/2000 | Acharya | ................. | H03M 7/40 |
| | | | | | | 341/59 |
| 2001/0016008 | A1 | * | 8/2001 | Bahl | ..................... | H04N 19/00 |
| | | | | | | 375/240.18 |

FOREIGN PATENT DOCUMENTS

| KR | 0181050 B1 * 10/1999 | |
| WO | WO-2005036885 A1 * 4/2005 | ........... H04N 19/547 |

OTHER PUBLICATIONS

Wang et al., "Discrete Wavelet Transform Based Multispectral Filter Array Demosaicking" (Year: 2013).*

(Continued)

*Primary Examiner* — Robert J Hance
(74) *Attorney, Agent, or Firm* — Greer, Burns & Crain, Ltd.; Steven P. Fallon

(57) ABSTRACT

A method for processing image or video data is performed in an image processing pipeline. Color filtered mosaiced raw image or video data is received. A one-level wavelet transform of subbands of the color filtered mosaiced raw image or video data to provide LL, HH, LH and HL subbands. The LH and HL subbands are de-correlated by summing and difference operations to provide decorrelated sum and difference subbands. Additional n-level wavelet transformation on the sum and difference subbands and the LL and HH subbands to provide sparsified subbands for encoding. LL and HH and sum subbands are recombined into standard color images e.g., red, green, and blue color components, (Continued)

which are subsequently processed by color correction, white balance, and gamma correction. The sparsified subbands are encoded.

10 Claims, 5 Drawing Sheets

(51) Int. Cl.
    *G06T 1/20*     (2006.01)
    *H04N 9/31*     (2006.01)
    *H04N 19/124*     (2014.01)
    *H04N 9/04*     (2006.01)
    *H04N 19/186*     (2014.01)
    *H04N 19/635*     (2014.01)

(52) U.S. Cl.
    CPC ......... *H04N 9/3182* (2013.01); *H04N 19/124* (2014.11); *H04N 19/186* (2014.11); *H04N 19/63* (2014.11); *H04N 19/635* (2014.11)

(56) References Cited

OTHER PUBLICATIONS

Sathik et al., "Hybrid Compression of CFA Images Using Edge Based Segmentation" (Year: 2011).*
Zhang et al., "PCA-Based Spatially Adaptive Denoising of CFA Images for Single-Sensor Digital Cameras" (Year: 2009).*
Zhang et al., "Lossless Compression of Color Mosaic Images", IEEE Transactions on Image Processing, 2006, pp. 1379-1388, vol. 15, No. 6, IEEE.
Malvar et al., "Progressive-to-Lossless Compression of Color-Filter-Array Images using Macropixel Spectral-Spatial Transformation", Proceedings of the Data Compression Conference, 2012, pp. 3-12, IEEE.
Gu et al., "Filterbank-Based Universal Demosaicking", Proceedings of 2010 IEEE 17th International Conference on Image Processing, 2010, pp. 1981-1984, IEEE.
Hirakawa et al., "'Rewiring' Filterbanks for Local Fourier Analysis: Theory and Practice", IEEE Transactions on Information Theory, 2011, pp. 5360-5374, vol. 57, No. 8, IEEE.
Korneliussen et al., "Camera Processing With Chromatic Aberration", IEEE Transactions on Image Processing, 2014, pp. 4539-4552, vol. 23, No. 10, IEEE.
Chung et al., "A Lossless Compression Scheme for Bayer Color Filter Array Images", IEEE Transactions on Image Processing, 2008, pp. 134-144, vol. 17, No. 2, IEEE.
Lee et al., "A Novel High Dynamic Range Image Compression Scheme of Color Filter Array Data for the Digital Camera Pipeline", 2012 19th IEEE International Conference on Image Processing, 2012, pp. 325-328, IEEE.
Kim et al., "Lossless Compression of Color Filter Array Images by Hierarchical Prediction and Context Modeling", IEEE Transactions on Circuits and Systems for Video Technology, 2014, pp. 1040-1046, vol. 24, No. 6, IEEE.
Lin et al., "Novel Chroma Subsampling Strategy Based on Mathematical Optimization for Compressing Mosaic Videos With Arbitrary RGB Color Filter Arrays in H.264/AVC and HEVC", IEEE Transactions on Circuits and Systems for Video Technology, 2016, pp. 1722-1733, vol. 26, No. 9, IEEE.
Trifan et al., "A Survey on Lossless Compression of Bayer Color Filter Array Images", International Journal of Computer, Electrical, Automation, Control and Information Engineering, 2016, pp. 585-590, vol. 10, No. 4, World Academy of Science, Engineering and Technology.
Hirakawa et al., "A Framework for Wavelet-Based Analysis and Processing of Color Filter Array Images with Applications to Denoising and Demosaicing", 2007 IEEE International Conference on Acoustics, Speech and Signal Processing, 2007, pp. I-597-I-600, IEEE.
Alleysson et al., "Linear Demosaicing Inspired by the Human Visual System", IEEE Transactions on Image Processing, 2005, pp. 439-449, vol. 14, No. 4, IEEE.
Gunturk et al., "Demosaicking: Color Filter Array Interpolation", IEEE Signal Processing Magazine, 2005, pp. 44-54, vol. 22, No. 1, IEEE.
Lakshmi et al., "Visually lossless compression for Bayer color filter array using optimized Vector Quantization", Applied Soft Computing, 2016, pp. 1030-1042, vol. 46, Elsevier B.V..

* cited by examiner

SAMPLED IMAGE COMPRESSION METHODS AND IMAGE PROCESSING PIPELINE

PRIORITY CLAIM AND REFERENCE TO RELATED APPLICATION

The application claims priority under 35 U.S.C. § 119 and all applicable statutes and treaties from prior provisional application Ser. No. 62/698,467, which was filed Jul. 16, 2018.

FIELD

A field of the invention is image and video processing. An example application of the invention is to digital cameras, for example, consumer and professional level digital cameras. The invention also provides compression that can make storage of raw video data practical. Additional applications include cloud and internet-of-things applications.

BACKGROUND

Digital imaging systems, including cameras that obtain still and video data, include an image sensor and a color filter. The image sensor itself is capable of sensing intensity of radiation at each pixel of the sensor, which ranges into tens of millions of pixels for modern cameras. Color filters are used to sense color components of each pixel. Known as color filter array or CFA, pixel-sized color filters are patterned to provide three separate color channels, e.g., red (R), green (G), and Blue (B) channels. Each pixel of the image sensor is filtered by the color filter to receive only one of the three or more colors. Accordingly, each pixel does not physically record the full color spectrum incident upon that pixel. The image read out by the sensor is referred to as raw image or raw sensor image or color mosaic image or CFA image. Pixel values of raw images are encoded with pixel intensities, as filtered by their respective color filter array at that pixel. The digital imaging system therefore includes a processing pipeline to process raw image data from the image sensor. A critical initial function of the processing pipeline as used in known imaging systems ranging from inexpensive digital cameras to the highest-level professional model SLR and mirrorless cameras is recovering the fully color value at each pixel of the image sensor as described by intensity of at least three color components, e.g., red, green, and blue. This process is known as de-mosaicing and is conducted as one of the earliest stages of imaging processing.

The de-mosaicing obtains a full-color image, including a set of complete red, green, and blue values (or other color space channels) for each pixel. This de-mosaicing process is required to render raw images into a viewable format.

A widely used patterning of color filters is known as a Bayer color filter array. The de-mosaicing process when the Bayer color filter array is employed is sometimes referred to as debayering. The process is complex but also must be conducted at high speed. Modern imaging systems are capable of processing many images per second. Rendering of these images, such as via viewfinder requires de-mosaicing. Different camera manufacturers and image processing software systems employ different techniques for de-mosaicing. All are designed to permit rendering of a full image in real time or close to real time.

Professional photographers and photo enthusiasts prefer to work directly with the raw sensor data to gain maximum control over the post-processing and set their cameras to store raw sensor data for each frame. Storing the raw sensor data is challenging because of the presence of color filter array, and requires an effective, lossless or low loss (lossy), compression scheme. Many professional grade cameras, for example, are capable of acquiring 5-10 or more frames of data per second, which places significant demands upon compression and storage operations.

Wavelet compression is an image compression technique that can be lossless or lossy. Lossless compression permits an image to be perfectly reconstructed by the compressed data, whereas lossy compression permits an approximation of a perfectly reconstructed image as a function of some compression rate. Zhang and Wu provided a reversible lossless spectral-spatial transforms that can remove statistical redundancies in both spectral and spatial domains and applied the Mallat wavelet decomposition scheme, called Mallat wavelet packet transform, to the task of decorrelating color mosaic data. Zhang & Wu, "Lossless Compression of Color Mosaic Images," IEEE Trans Image Process. 2006 June; 15(6):1379-88. Malvar and Sullivan describe a low-complexity integer-reversible spectral-spatial transform that allows for efficient lossless and lossy compression of raw sensor images. The technique maps the pixel array values into a format that can be directly compressed in a lossless, lossy, or progressive-to-lossless manner. The technique uses an invertible macropixel spectral-spatial transformation (MSST) for each macropixel of a CFA as a pre-processing stage. Malvar and G. J. Sullivan, "Progressive to lossless compression of color filter array images using macropixel spectralspatial transformation," IEEE Conference of Data Compression, 2012.

It was empirically observed that the one-level wavelet transform of a CFA sampled image was predominantly low passed. N. Zhang and X. Wu, "Lossless compression of color mosaic images," IEEE Trans. Image Process., vol. 15, pp. 1379-1388, May 2006. There is a profound difference between the LeGall 5/3 wavelet transform of a CFA sampled image shown and the wavelet transform of a luminance image. Specifically, the wavelet sub bands (i.e. LH, HL, and HH) in a CFA wavelet are not sparse, unlike the highly compressible high pass components of an ordinary wavelet. Zhang and X. Wu therefore proposed a Mallat wavelet packet decomposition to sparsify the wavelet transformed raw sensor image data with additional multiresolution analysis.

A rigorous analysis the wavelet transform applied to raw sensor image data has been published. K. Hirakawa and P. J. Wolfe, "Rewiring filterbanks for local fourier analysis: Theory and practice," IEEE Trans. Inf. Theory, vol. 57, pp. 5360-5374, July 2011. J. T. Korneliussen and K. Hirakawa, "Camera processing with chromatic aberration," IEEE Trans. Image Process., vol. 23, pp. 4539-4552, August 2014. The analysis is summarized as follows. Let $x(n)=[r(n)g(n)b(n)]^T$ be a color image where $(r(n)g(n)b(n))$ represent the red, green, and blue color components, respectively. Then the CFA sampled data $y(n)$ at pixel location is:

$$y(n) = c(n)^T x(n) \qquad (1)$$
$$= g(n) + c_r(n)\alpha(n) + c_b(n)\beta(n)$$

where $\alpha$ and $\beta$ defined as $\alpha(n)=r(n)-g(n)$ and $\beta(n)=b(n)-g(n)$ are taken to be proxies for chrominance images; and the vector $c(n)=[c_r(n)c_g(n)c_b(n)]^T \in \{0,1\}^3$ is a sampling lattice (e.g. c(n)=[1 0 0] denotes a red pixel at pixel location n). The CFA sampled image of (1) is composed of luminance components (fully observed green pixels) and chrominance components (sparsely sampled color differences). The advantage to such decomposition is that $\alpha$ and $\beta$ are lowpass signals.

The first level input of y(n) is:

$$w_{i,j}^{y}(n)=w_{i,j}^{g}+w_{i,j}^{cr\cdot\alpha}(n)+w_{i,j}^{cb\cdot\beta}(n) \quad (2)$$

where $w^c$ denotes the wavelet coefficient for components c (e.g., c=g), and the subband index $(i,j)\in\{L, H\}^2$ denotes lowpass (L) and highpass (H) in the vertical and horizontal directions.

Let L* and H* denote subbands of conjugate wavelet transform coefficients computed using conjugated wavelet filters. Approximating the detail coefficients of chrominance by zero (i.e., $w_{i,j}^{\alpha}(n)=w_{i,j}^{\beta}(n)$ for $(i,j)\neq\{1, L\}$, the wavelet transform of (2) can be rewritten as:

$$w_{LL}^{y}(n)=w_{LL}^{g}(n)+\tfrac{1}{4}w_{LL}^{\alpha}(n)+\tfrac{1}{4}w_{LL}^{\beta}(n)$$

$$w_{LH}^{y}(n)=w_{LH}^{g}(n)+\tfrac{1}{4}w_{LL*}^{\alpha}(n)-\tfrac{1}{4}w_{LL*}^{\beta}(n)$$

$$w_{HL}^{y}(n)=w_{HL}^{g}(n)+\tfrac{1}{4}w_{L*L}^{\alpha}(n)-\tfrac{1}{4}w_{L*L}^{\beta}(n)$$

$$w_{HH}^{y}(n)=w_{HH}^{g}(n)+\tfrac{1}{4}w_{L*L*}^{\alpha}(n)+\tfrac{1}{4}w_{L*L*}^{\beta}(n) \quad (3)$$

The wavelet coefficients of the CFA sampled image are therefore interpreted as a linear combination of the coefficients of luminance and the lowpass coefficients of chrominance. This is appropriate because the LH, HL, and HH subbands are dominated by lowpass components $\alpha$ and $\beta$ (rather than the highpass components. The Hirakawa and P. J. Wolfe paper defined a relationship between the LH and HL subbands, which relationship has been applied to conduct de-mosaicing.

SUMMARY OF THE INVENTION

A method for processing image or video data is performed in an image processing pipeline. Color filtered mosaiced raw image or video data is received. A one-level wavelet transform of subbands of the color filtered mosaiced raw image or video data is conducted to provide LL, HH, LH and HL subbands. The LH and HL subbands are de-correlated by summing and difference operations to provide decorrelated sum and difference subbands. Additional n-level wavelet transformation on the sum and difference subbands and the LL and HH subbands provide sparsified subbands for encoding. The sparsified subbands are encoded.

DESCRIPTION OF THE PREFERRED EMBODIMENTS

Figure 1:
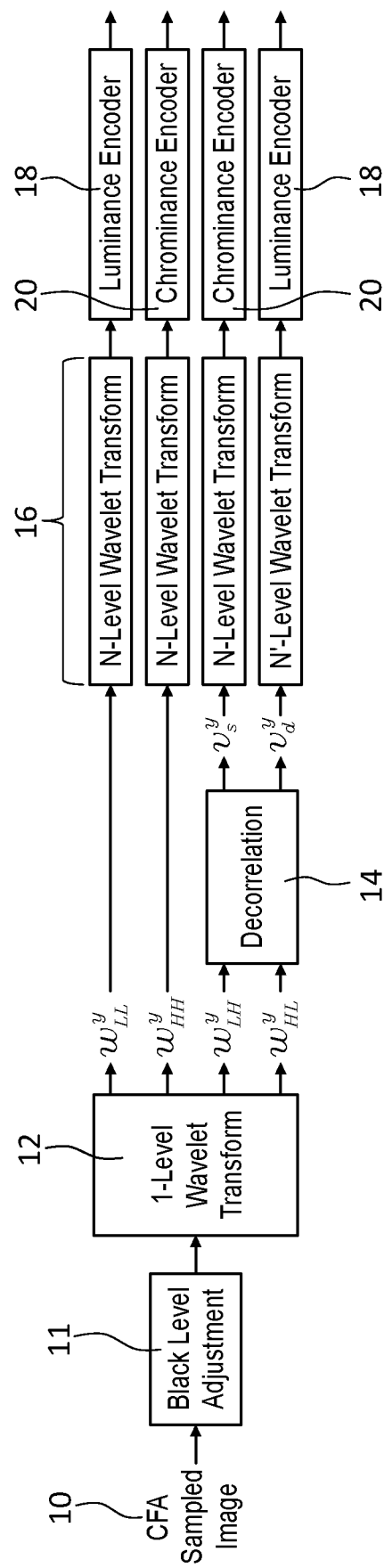
FIG. 1 shows a preferred image processing pipeline that conducts lossless compression of a CFA sampled image.

Preferred methods, pipelines and digital cameras of the invention provide include an efficient lossless or lossy compression that can maximize the quality of color images deconstructed from the decompressed CFA (color filter array) images. Images, as used herein, includes still images and video data, as the invention can be applied to frames of video data that are considered to be images. Preferred embodiments provide a lossless or lossy compression method for raw sensor data and leverage a de-correlated Mallat wavelet transform to generate sparse wavelet coefficients. An experimental system confirmed that methods of the invention improve coding efficiency compared to the standard and the state-of-the-art lossless CFA sampled image and video compression schemes. The wavelet coefficients of CFA sampled images are highly correlated. The present method further makes the correlated wavelet transform sparser. In addition, the invention provides a camera processing pipeline that can maximizing the quality of the color images constructed from the decompressed CFA sampled images and video streams.

The present inventors determined, and rigorous analysis has confirmed, that each one-level wavelet sub band of the CFA sampled image combines low frequency of chrominance and high frequency of luminance components. Lowpass components yield poor compression efficiency because their coefficients are not sparse. The inventors have also determined via analysis that the LH and HL subbands are highly correlated, which is leveraged for the first time in the present invention to enhance compression of raw image data.

Those knowledgeable in the art will appreciate that embodiments of the present invention lend themselves well to practice in the form of computer program products. Accordingly, it will be appreciated that embodiments of the present invention may comprise computer program products comprising computer executable instructions stored on a non-transitory computer readable medium that, when executed, cause a computer to undertake methods according to the present invention, or a computer configured to carry out such methods. The executable instructions may comprise computer program language instructions that have been compiled into a machine-readable format. The non-transitory computer-readable medium may comprise, by way of example, a magnetic, optical, signal-based, and/or circuitry medium useful for storing data. The instructions may be downloaded entirely or in part from a networked computer. Also, it will be appreciated that the term "computer" as used herein is intended to broadly refer to any machine capable of reading and executing recorded instructions. It will also be understood that results of methods of the present invention may be displayed on one or more monitors or displays (e.g., as text, graphics, charts, code, etc.), printed on suitable media, stored in appropriate memory or storage, streamed after encoding, uploaded to the cloud, transmitted via wired or wireless connection, employed in the internet of things, implemented in hardware, integrated circuits, application specific integrated circuits, etc.

Preferred embodiments of the invention will now be discussed with respect to the drawings and experiments used to demonstrate the invention. The drawings may include schematic representations, which will be understood by artisans in view of the general knowledge in the art and the description that follows.

Lossless Compression

FIG. 1 shows a preferred image processing pipeline that conducts lossless compression of a CFA sampled image. The input to the pipeline is a CFA sampled image 10. A black level adjustment 11 can be conducted. A one level wavelet transform 12 is conducted on four subbands, LL, HH, LH and HL. A decorrelator 14 decorrelates the LH and HL subbands. During decorrelation, the LH and HL subbands are subjected to a summing and differencing operation ($v_s^y(n)=w_{LH}^y+w_{HL}^y$ and $v_d^y(n)=w_{LH}^y-w_{HL}^y$)(further detailed definitions of the sum and difference operations are below). N-level wavelet transforms 16 further transform the LL, HH subbands and the decorrelated LH, HL subbands. Luminance encoders 18 encode the N-level transformed LL subbands and the decorrelated difference channel $v_d^y$. Chrominance encoders 20 encode the N-level transformed HH subbands and the decorrelated sum channel $v_s^y$.

Each one-level wavelet subband of the CFA sampled image combines low frequency of chrominance and high frequency of luminance components. Lowpass components yield poor compression efficiency because their coefficients are not sparse. The inventors note that, even if decomposed by subsequent wavelet transforms, the coefficients $w_{LL^*}^\alpha$, $w_{L*L}^\alpha$, $w_{LL^*}^\beta$ and $w_{L*L}^\beta$ would never achieve the compression rate of $v_s^y$ and $v_d^y$ because the latter have a finer scale wavelet transform. The * denotes the subbands of conjugate wavelet transform coefficients computed using conjugated wavelet filters as described in K. Hirakawa and P. J. Wolfe, "Rewiring filterbanks for local fourier analysis: Theory and practice," IEEE Trans. Inf. Theory, vol. 57, pp. 5360-5374, July 2011.

Figures 2A, 2B:
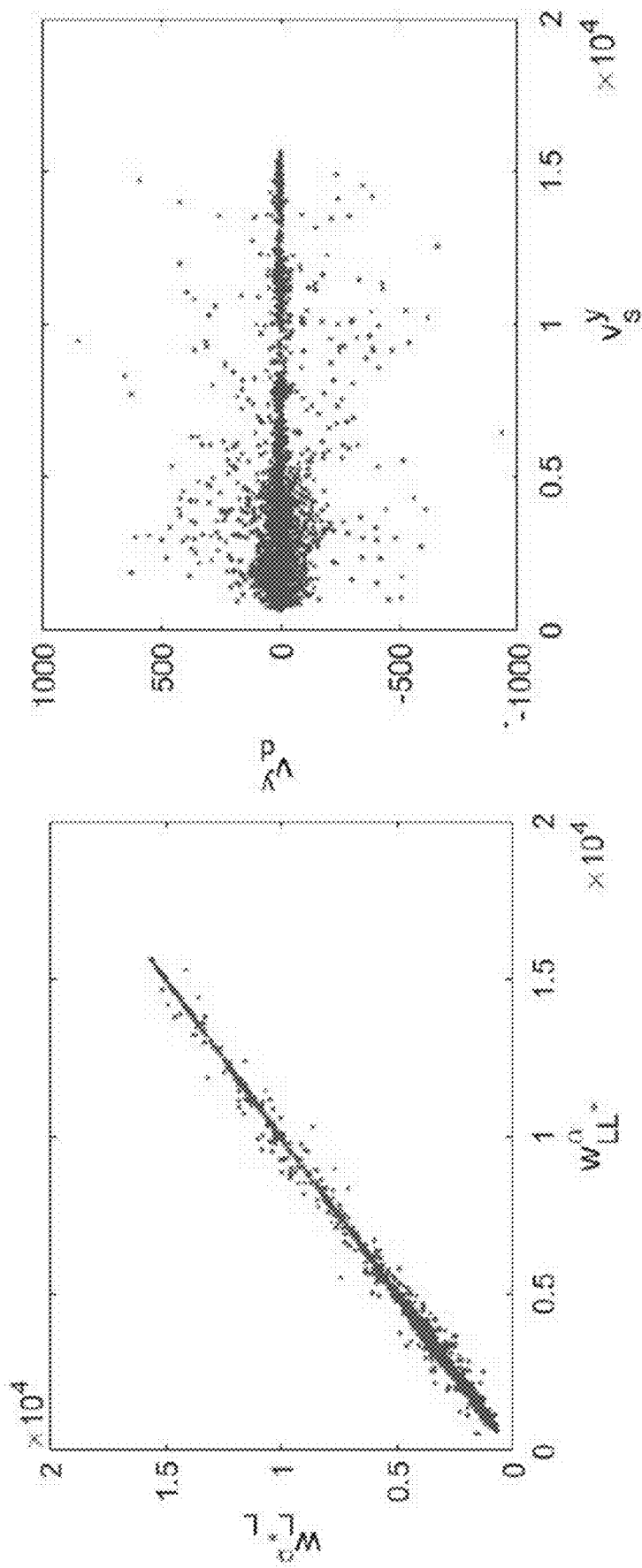
FIG. 2A plots correlated wavelet coefficients.
FIG. 2B shows the results of the de-correlation of the LH and HL sub-bands in the FIG. 1 processing pipeline.

In a preferred embodiment, the decorrelator 14 decorrelates $w_{LH}^g$ and $w_{HL}^g$ by orthogonal transformation using the bases $[1\ 1]^T$ and $[-1\ 1]^T$. Considering (3), $w_{LL^*}^\alpha$ in $w_{LH}^y$ and $w_{L*L}^\alpha$ in $w_{HL}^y$ are the transforms of the same chrominance image $\alpha$ using two different wavelet types. As such, they are highly correlated, as evidenced by $w_{LL^*}^\alpha$ plotted against $w_{L*L}^\alpha$, as shown in FIG. 2A. The strength of correlation as indicated by the Pearson moment correlation coefficient is 0.9989. The same relation holds for $w_{LL^*}^\beta$ and $w_{L*L}^\beta$. In the preferred embodiment, the decorrelator 14 replaces $w_{LH}^y$ and $w_{HL}^y$ by the decorrelated coefficients, which are defined by the following:

$$v_d^y(n) = w_{LH}^y(n) - w_{HL}^y(n) =$$

$$w_{LH}^g(n) - w_{HL}^g(n) + 1/4(w_{LL^*}^\alpha(n) - w_{L*L}^\alpha(n)) - 1/4(w_{LL^*}^\beta(n) - w_{L*L}^\beta(n))$$

$$v_s^y(n) = \left\lfloor \frac{1}{2}(w_{LH}^y(n) + w_{HL}^y(n)) \right\rfloor =$$

$$\left\lfloor \frac{1}{2}(\{w_{LH}^g(n) + w_{HL}^g(n) + 1/4(w_{LL^*}^\alpha(n) + w_{L*L}^\alpha(n)) - 1/4(w_{LL^*}^\beta(n) + w_{L*L}^\beta(n))\}) \right\rfloor$$

The [ . . . ] denotes a floor (rounding down) operation. The coefficients $w_{LH}^y(n)$ and $w_{HL}^y(n)$ can be perfectly reconstructed from $v_d^y(n)$ and $v_s^y(n)$ from the following relationships:

$$w_{HL}^y(n) = v_s^y(n) - \left\lfloor \frac{v_d^y(n)}{2} \right\rfloor,$$

$$w_{LH}^y(n) = v_d^y(n) + w_{HL}^y(n)$$

The difference subband $v_d^y(n)$ decorrelates $w_{LL^*}^\alpha$ and $w_{L*L}^\alpha$ as well as $w_{LL^*}^\beta$ and $w_{L*L}^\beta$. FIG. 2B shows the result of the decorrelation, which is also confirmed by the fact that correlation coefficient reduces to −0.0378. Artisans will appreciate that the each of differences $w_{LL^*}^\alpha-w_{L*L}^\alpha(n)$ and $w_{LL^*}^\beta-w_{L*L}^\beta(n)$ represents a bandpass transform of the respective lowpass signals $\alpha$ and $\beta$ by a filter LL*−L*L, which is very small.

The decorrelated coefficient $v_d^y(n)$ consists of bandpass components $w_{LL^*}^\alpha-w_{L*L}^\alpha$ and $w_{LL^*}^\beta-w_{L*L}^\beta$, which are approximately zero, and a highpass component $w_{LH}^g-w_{HL}^g$. For this reason, the N-level transform 16 can include a minimal number of additional levels of wavelet transforms. Conventional additional N'-level wavelet transforms can be conducted. A preferred wavelet transform is LeGall 5/3 in lossless and 9/7 biorthogonal wavelet in lossy, where N>>N'. In a preferred embodiment, a LeGall 5/3 transform is used to sparsify $v_d^y$. Then the transformed $v_d^y$ is encoded by the luminance highpass encoding scheme because $v_d^y$ is dominated by $w_{HL}^g$ and $w_{LH}^g$. The coding efficiency is nonetheless comparable to the fine level wavelet transform coefficients $w_{HL}^g$ and $w_{LH}^g$. The decorrelation of the invention works with any off-the-shelf encoding methods, and experiments demonstrated the effectiveness in both of a JPEG2000 encoder and in HEVC encoder. After pixels are turned into wavelet transform coefficients (or in in the present invention, decorrelated wavelet transform coefficients), the wavelet coefficient values must be turned into "bits." This is sometimes called the "encoder" or "variable length encoder" or "entropy coder," which can be JPEG2000. Advantageously, the decorrelation of the present invention is "encoder-agnostic," and is independent of the entropy encoder that is used. Entropy encoders are most efficient when coding sparse signal. The decorrelated wavelet transform provided by the invention provides a sparse signal, such that encoder requires fewer bits. Preferred embodiments provide a transform that yields a very sparse output, which is a benefit to any entropy encoder.

The sum subband $v_s^y$ represents a combination of low pass components of $\alpha$ and $\beta$ by the filter LL*−L*L, which is also a lowpass component. The wavelet coefficient $v_s^y$ is thus dominated by the chrominance $w_{LL}^\alpha$ and $w_{LL}^\beta$ and can be treated as a chrominance image. This can be further decomposed by applying an additional LeGall 5/3 transform when using a lossless compression, or 9/7 biorthogonal wavelet transform when using a lossy compression. The N-level wavelet transform of $v_s^y$ is encoded (N>>N') by the lossless encoding scheme of the chrominance component.

The components $w_{LL}^y$ and $w_{HH}^y$ in (3) play the roles of lowpass luminance and chrominance, respectively. Hence, additional wavelet decompositions are applied. N-level Mallat wavelet packet transforms of $w_{LL}^y$ and $w_{HH}^y$ are encoded by luminance and chrominance encoders 18 and 20, respectively.

In wavelet-based compression schemes such as JPEG2000, the coding efficiency increases as more coefficients are concentrated near zero. In order to distribute coefficients around zero, each color component of the CFA sampled image can be shifted by adjusting its offset before taking wavelet transform, as follows:

$$y'(n)=y(n)-k$$

where $k=[k_r k_g k_b]^T$. The shift k is stored as sideband information to be used to later decompress the image. In experiments, the black offset was computed from a calibration using a color checker. This has the effect of shifting $v_s^y \cong (w_{LL^*}^\alpha + w_{L*L}^\alpha)/2$ and $w_{HH}^y(n) \cong w_{L*L}^\beta$ toward zero, which further increases coding efficiency.

Lossy Compression

Figure 3:
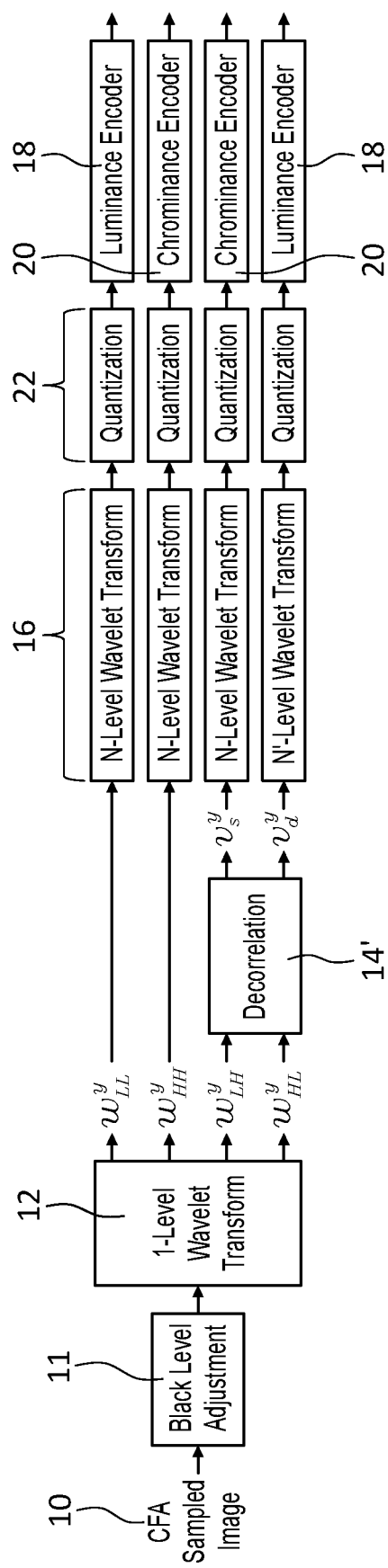
FIG. 3 shows a preferred image processing pipeline that conducts lossy compression of a CFA sampled image.
Figure 4:
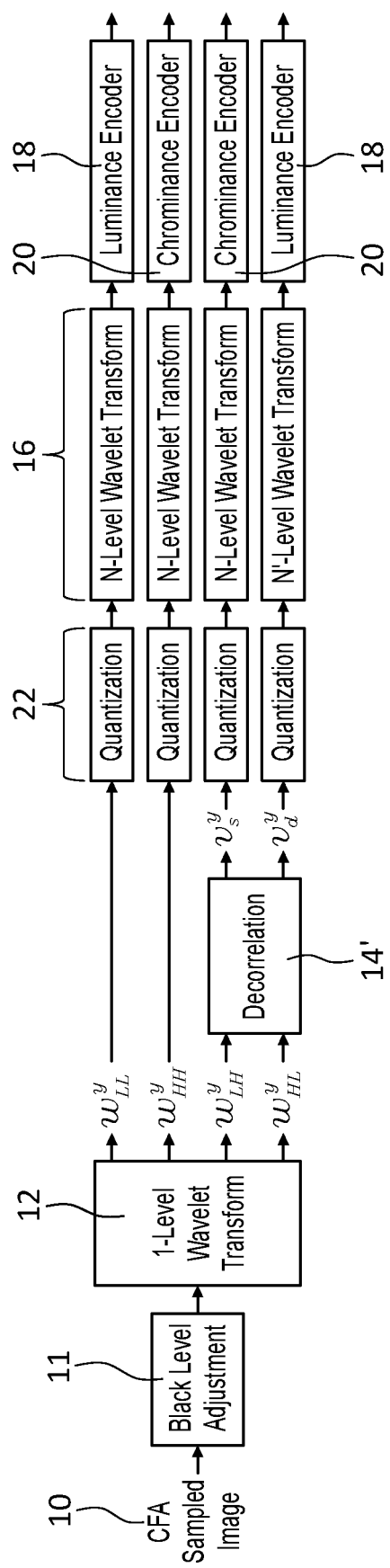
FIG. 4 shows another preferred image processing pipeline that conducts lossy compression of a CFA sampled image.

FIG. 3 shows a preferred image processing pipeline that conducts lossy compression of a CFA sampled image. This embodiment adds quantizers 22 between the N-level wavelet transform 16 and the luminance 18 and chrominance 20 encoders. An example transform for the N-level wavelet transform is the Daubechies 9/7 biorthogonal wavelet transform, which has highly correlated $w_{LL*}^\alpha$ and $w_{L*L}^\alpha$ coefficients. FIG. 4 quantizes prior to the N-level wavelet transform.

In the lossy compression, $w_{LH}^y$ and $w_{HL}^y$ are decorrelated by a non-integer transformation. A relationship for this transformation is:

$$\begin{bmatrix} v_s^y(n) \\ v_d^y(n) \end{bmatrix} = M \begin{bmatrix} w_{LH}^y(n) \\ w_{HL}^y(n) \end{bmatrix},$$

where $M \in \mathbb{R}^{2\times 2}$. In FIG. 4, it is $v_s^y$ and $v_d^y$ that are quantized. The quantized versions can be defined as $\hat{v}_s^y(n) = v_s^y(n) + q_s(n)$ and $\hat{v}_{sd}^y(n) = v_d^y(n) + q_d(n)$, where $q_s(n)$ and $q_d(n)$ are the quantization errors, which can be approximated as a random variable uniformly distributed over the range of [−0.5, 0.5]. With the choice of M to be $M \in \mathbb{R}^{2\times 2}$, the error between the wavelet coefficients w and its quantized coefficients can be minimized while penalizing non-sparsity of the decorrelated coefficients v, as follows:

$$\arg\min_M \sum_n \left\| \begin{bmatrix} w_{LH}^y(n) \\ w_{HL}^y(n) \end{bmatrix} - M^{-1} \begin{bmatrix} v_s^y(n) + q_s(n) \\ v_d^y(n) + q_d(n) \end{bmatrix} \right\|_2^2 + \lambda \sum_n \left\| \begin{bmatrix} v_s^y(n) \\ v_d^y(n) \end{bmatrix} \right\|_1.$$

Here, the first term is the fidelity term penalizing distortions caused by the quantization. The L1 norm in the second term is designed to promote sparse representation. By the law of large numbers (as denoted by the expectation operator $\mathbb{E}$ the above can be approximated applying to the quantization errors $q_s$ and $q_d$ $$\arg\min_M \mathbb{E}\left\{ \sum_n \left( \left\| M^{-1} \begin{bmatrix} q_s(n) \\ q_d(n) \end{bmatrix} \right\|_2^2 + \lambda \left\| \begin{bmatrix} v_s^y(n) \\ v_d^y(n) \end{bmatrix} \right\|_1 \right) \right\} =$$

$$\arg\min_M \frac{1}{12} \|M^{-1}\|_F^2 + \lambda \sum_n \left\| \begin{bmatrix} v_s^y(n) \\ v_d^y(n) \end{bmatrix} \right\|_1,$$

where the simplification by the Frobenius norm $\|\cdot\|_F^2$ stems from the assumption that $q_s$ and $q_d$ are zero mean and independent. Increasing the value of $\lambda$ promotes sparsity (and coding efficiency) at the sacrifice of the reconstruction error. In practice:

$$M \approx k \cdot \begin{bmatrix} a & a \\ b & -b \end{bmatrix},$$

where the transformation of a and b were stable while k decreased with increasing $\lambda$, where $v_s^y \approx ka(w_{LH}^\alpha + w_{HL}^\alpha)$ and $v_d^y \approx ka(w_{LH}^l + w_{HL}^l)$. This is reasonable because horizontal $w_{LH}^l$ and vertical $w_{HL}^l$ coefficients behave similarly. The above minimization can also be performed numerically by gradient descent. Data plots verified that the transformation M decorrelates the $v_s^y$ and $v_d^y$ coefficients, and the Pearson product-moment correlation coefficient decreased to 0.014. The entropy of the decorrelated coefficient reduced from 12.05 to 6.91.

Optimization of Wavelet Transforms

There are two main sources of distortions in lossy compression: round-off error and quantization error. The round-off error stems from finite precision operators used to carry out the forward and reverse wavelet transforms. The quantization error (commonly referred to as the "residual error") is caused by reducing the number of bits to represent wavelet coefficients, at the expense of accuracy. Specifically, a larger quantization step yields higher compression ratio and higher loss in quality.

The interactions between the two sources of noise depend on the bitrate. Although the quantization errors dominate at the low bitrates, the round-off error limits the image quality at the higher bitrates. The inventors have determined that better quality would be achieved if the round-off error is reduced at the higher bitrates. By experimentation, we heuristically arrived at an alternative decomposition scheme that performs better at high bitrates. With regard to FIG. 4 the optimization quantizes the coefficients after the first level Daubechies 9/7 or LeGall 5/3 wavelet transform and takes the decorrelation step. The decorrelated coefficients are quantized before using the LeGall 5/3 to carry out the Mallat-like wavelet packet transform on $w_{LL}^y$, $w_{HH}^y$, and $v_s^y$. The LeGall transformation is an integer operation. Since the LeGall 5/3 wavelet transform is reversible, no additional round-off errors are expected. This is in contrast and advantageous compared to the conventional compression scheme of quantizing the coefficients after multiple-level wavelet transform as in H. S. Malvar and G. J. Sullivan, "Progressive-to-lossless compression of color-filter-array images using macropixel spectral-spatial transformation," in Proc. IEEE Conf. Data Compress. (DCC), Snowbird, Utah, USA, April 2012, pp. 3-12.

As the quantization step increases, the round-off error become insignificant relative to the quantization error. Hence at the lower bitrates, we empirically found that Daubechies 9/7 would be more effective for the decorrelated wavelet coefficients.

Camera Processing Pipeline-Aware Lossy Compression

Figure 5:
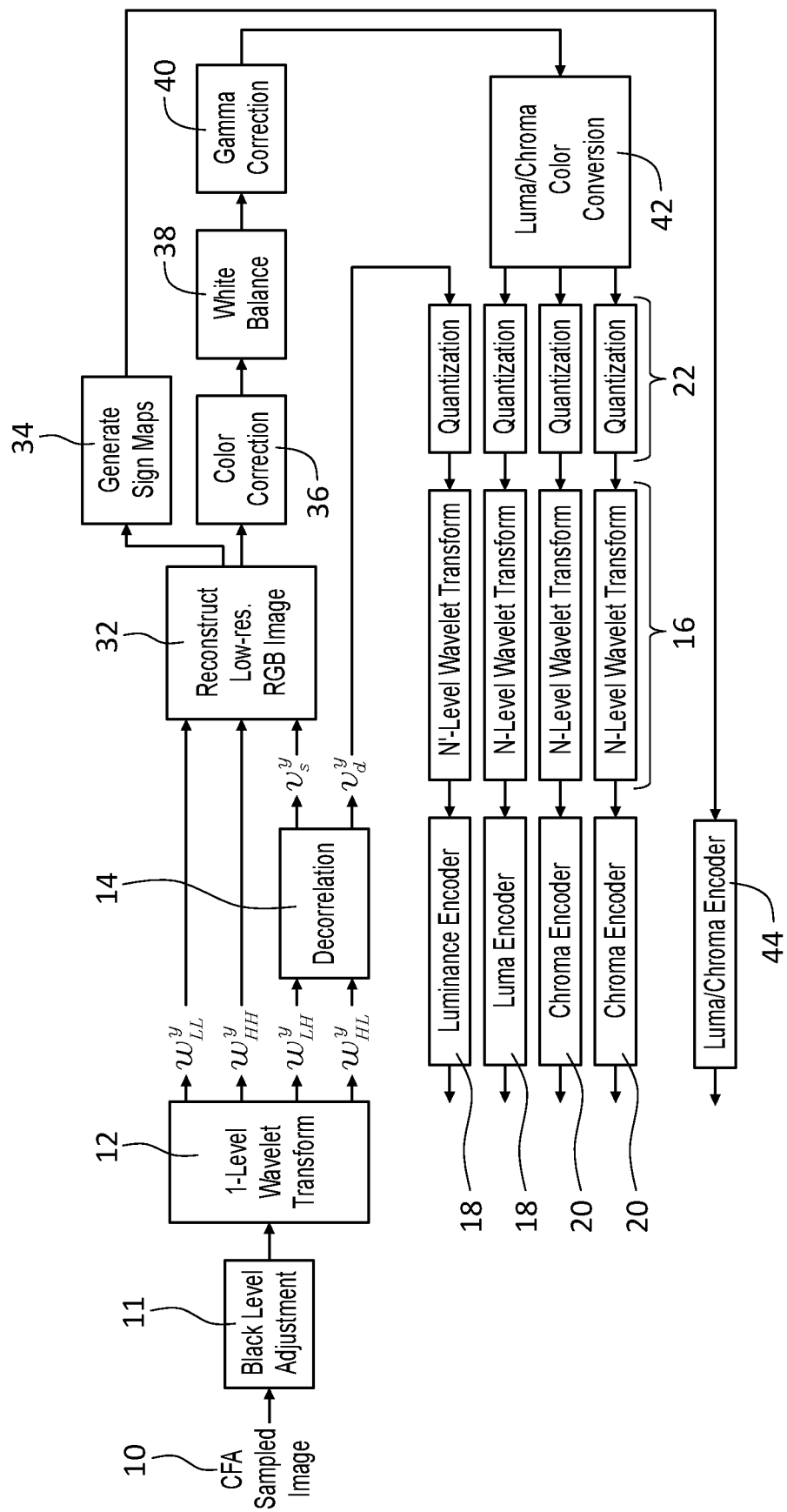
FIG. 5 shows a preferred image processing pipeline that conducts image aware compression.

Lossy compression yields an approximation of the desired image with fewer bits. The error introduced by the lossy compression is not uniform to the eye. This is because the uncompressed raw sensor data is further processed by camera processing pipeline (which is comprised of black offset, color correction, white balance, gamma correction, among others) before the image can be observed by the eye. When the error introduced by a uniform quantization propagates through the camera processing pipeline, the end result error is no longer uniform. FIG. 5 provides a camera processing pipeline-aware solution to reduce such distortion. In FIG. 5, a low resolution color construction 32 without the decorrelated $v_d^y$ subband is conducted, which permits the generation of sign maps 34 and steps to conduct color correction 36, white balance correction 38 and gamma correction 40. Prior to quantization, a luma/chroma conversion 42 is conducted to decompose the corrected low resolution RGB image (or other canonical color space).

The color construction 32 operation relies upon the fact that the color components x(n) are reconstructable from l, $\alpha$, and $\beta$ by the relation:

$$x(n) = \begin{bmatrix} 1 & 2 & 1 \\ 1 & 0 & -1 \\ 1 & -2 & 1 \end{bmatrix} \begin{bmatrix} \ell(n) \\ \alpha(n) \\ \beta(n) \end{bmatrix}$$

If $w_{LL}^y \approx w_{LL}^l$, $w_{HH}^y \approx w_{LL}^\beta$, and $v_s^y \approx w_{LL}^\beta$ (or $2kaw_{LL*}^\alpha$) are taken as the "quarter resolution" versions of l, $\alpha$ and $\beta$, then the following relation permits reconstruction:

$$w_{LL}^x(n) \approx \begin{bmatrix} 1 & 2 & 1 \\ 1 & 0 & -1 \\ 1 & -2 & 1 \end{bmatrix} \begin{bmatrix} w_{LL}^y(n) \\ v_s^y(n) \\ w_{HH}^y(n) \end{bmatrix}$$

($v_s^y$ is replaced by $v_s^y/2$ ka if lossy). In other words, the reconstruction 32 can approximately recover a quarter resolution color image $w_{LL}^x(n)$ directly from the decorrelated one-level wavelet transform coefficients.

Then the corrections used match that used in the camera processing. First, the black offset is subtracted. A demosaicking step estimates the color image from the CFA sampled image. In color correction 36, the tristimulus values of the recovered image corresponding to the spectral transmittance of the color filters are converted to a canonical color space by multiplying by a color transformation matrix. The "white balance" 38 rescales the color to make it (nearly) invariant to the illumination color. Lastly, a compander known as gamma correction 40 enhances the low-intensity pixels while compressing the high-intensity pixels by a non-linear mapping.

FIG. 5 provides a compression designed to minimize the distortion of the color corrected, white balanced, gamma corrected low-resolution color image, and is based upon the premise that the compression would also subsequently maximize the quality of the high-resolution color image reconstructed from the decompressed CFA sampled image. For example, "post-gamma correction" quantization quantizes less aggressively in dark regions where the human eye is more sensitive, while the range compression of the bright regions improves the coding efficiency. Similarly, the combination of color correction and white balance ensures that distortions stemming from lossy compression do not implicitly favor one color over another. FIG. 5 shows a subsequent JPEG2000 compression, where the gamma corrected quarter resolution color image is converted to luma/chroma components, and then N-level wavelet transform is performed and quantization is conducted before encoding the bits. Artisans will appreciate that the invention is independent of the particular image/video compression algorithm employed. The pre-processing of the invention ensures that (a) raw compression is visually optimal for the post-camera processing pipeline image, and (b) reduces the resolution of the image to ¼ so whatever encoding scheme is employed needs to encode far fewer wavelet coefficients. The invention can be considered agnostic to the particular image/video compression scheme that is used.

We note that the approximation used by the low-resolution reconstruction essentially treats $v_s^y$ (sum of $w_{LL}^\alpha$ and $(w_{LH}^l + w_{HL}^l)/2$) like a lowpass component $w_{LL}^\alpha$—justified in part by the fact that $w_{LL}^\alpha$ dominates. There is effectively no image quality penalty associated with this approximation because the highpass components are more aggressively quantized in a typical compression scheme than the lowpass components. In other words, the highpass components included in $v_s^y$ are encoded with fewer quantization distortions than a typical compression scheme.

When recovering the quarter resolution color image, a few coefficients can take on negative values (which would not be there if this were the genuine color image). Thresholding them to zero would introduce additional distortion, which is unattractive. Instead, the pipeline takes the absolute value of $w_{LL}^x$, encoding the sign bits separately. The binary image of sign bits is encoded by the standard encoder, which added about 0.004 bits per pixel on average in testing.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A method for processing image or video data performed in an image processing pipeline, the method comprising:
receiving color filtered mosaiced raw image or video data;
conducting a one-level wavelet transform of the color filtered mosaiced raw image or video data to provide LL, HH, LH and HL subbands;
de-correlating the LH and HL subbands by summing and difference operations to provide decorrelated sum and difference subbands;
conducting additional n-level wavelet transformation on the sum and difference subbands and the LL and HH subbands to provide sparsified subbands for encoding, and
encoding the sparsified subbands.

2. The method of claim 1, wherein the color filtered mosaiced raw image or video data comprises CFA (color filter array) image data.

3. The method of claim 1, wherein the de-correlating comprises an orthogonal transformation.

4. The method of claim 1, further comprising quantizing the sum and difference subbands and the LL and HH subbands prior to conducting the additional n-level wavelet transformation.

5. The method of claim 1, wherein the de-correlating comprises replacing LH ($w_{LH}^y$) and HL ($w_{HL}^y$) subband coefficients by decorrelated sum $v_s^y$ and difference $v_d^y$ coefficients, according to the following the following:

$$v_d^y(n) = w_{LH}^y(n) - w_{HL}^y(n) =$$

$$w_{LH}^g(n) - w_{HL}^g(n) + 1/4(w_{LL*}^\alpha(n) - w_{L*L}^\alpha(n)) - 1/4(w_{LL*}^\beta(n) - w_{L*L}^\beta(n))$$

$$v_s^y(n) = \left[\frac{1}{2}(w_{LH}^y(n) + w_{HL}^y(n))\right] =$$

$$\left[\frac{1}{2}(\{w_{LH}^g(n) + w_{HL}^g(n) + 1/4(w_{LL*}^\alpha(n) + w_{L*L}^\alpha(n)) - 1/4(w_{LL*}^\beta(n) + w_{L*L}^\beta(n))\})\right],$$

wherein * denotes the conjugate wavelet transform.

6. The method of claim 1, further comprising an initial black level adjustment of the color filtered mosaiced raw image or video data.

7. The method of claim 1, further comprising, prior to n-level wavelet transformation:
creating a low resolution canonical color space image from the LL, HH, and sum subbands;
correcting the low-resolution image;
conducting a luma/chroma decomposition of the low-resolution image.

8. The method of claim 7, wherein the creating approximates a quarter resolution color image directly from coefficients of the LL, HH, and sum subbands.

9. The method of claim 1, wherein the correcting comprises color correction, white balance correction and gamma correction.

10. The method of claim 1, further comprising quantizing the sum and difference subbands and the LL and HH subbands prior to conducting the additional n-level wavelet transformation and wherein the N-level transform comprises a Daubechies 9/7 transform.

\* \* \* \* \*